United States Patent [19]

Aritomi

[11] 3,713,328

[45] Jan. 30, 1973

[54] AUTOMATIC MEASUREMENT OF VISCOSITY

[75] Inventor: Choji Aritomi, Hofushi, Yamaguchiken, Japan

[73] Assignee: Idemitsu Kosan Co., Ltd., Tokyo, Japan

[22] Filed: Feb. 24, 1971

[21] Appl. No.: 118,381

[52] U.S. Cl. .................................................73/55
[51] Int. Cl. ...........................................G01n 11/06
[58] Field of Search ..........................73/55, 56, 54

[56] References Cited

UNITED STATES PATENTS

| | | | |
|---|---|---|---|
| 3,604,247 | 9/1971 | Gramain et al. | 73/55 |
| 3,540,264 | 11/1970 | Cerrutti et al. | 73/55 |
| 3,071,961 | 1/1963 | Heigl et al. | 73/55 |

OTHER PUBLICATIONS

Jones, G. et al., The Automatic Timing of the Ostwald Viscometer by Means of a Photoelectric Cell, in Journal of Physics, Vol. 4, pp. 215–224, June 1933.

Primary Examiner—Louis J. Capozi
Assistant Examiner—Joseph W. Roskos
Attorney—Fred C. Philpitt

[57] ABSTRACT

The viscosity of a liquid is automatically measured by an apparatus comprising a Lantz-Zeitfuchs type reverse flow viscosimeter; a timing means actuated by photoelectric devices consisting of pairs of photoelectric cell and light source; a sequence control system; pumps and electromagnetic switch valves; said pumps and valves being internally communicated with said viscosimeter; said photoelectric cells being electrically connected to said sequence control system; whereby the actuations of said valves and pumps are programmed in sequence for measuring the time for viscosity counting, for washing and for drying the viscosimeter. The viscosimeter is placed in a constant temperature bath and has a timing bulb which is of one piece with protection tubes encasing light source lamps and photoelectric cells in pairs at the upper and lower timing marks of said bulb.

8 Claims, 2 Drawing Figures

AUTOMATIC MEASUREMENT OF VISCOSITY

This invention relates to a method and an apparatus for automatically measuring the viscosity of a liquid, and more particularly to an apparatus for automatically measuring the viscosity based on Lantz-Zeitfuchs Hantz-Zeitfuchs type reverse flow viscosimeter.

As for apparatuses for automatically measuring viscosity, there have been heretofore known those supplied from Precision Scientific Co., U.S.A., which are based upon an Atlantic viscosimeter and those supplied from Rigo-sha company, Japan, which are based upon an Atlantic viscosimeter, a Cannon-Fenske routine viscosimeter, a Cannon-Fenske opaque viscosimeter and a Ubbelohde viscosimeter. Since the former apparatus is based on an Atlantic viscosimeter, its samples are restricted only to transparent liquids and no leakage is permitted from the valve for holding the sample in a measuring bulb. Furthermore, the viscosimeter is so shaped that its suction-exhaust pipe must penetrate through the bottom of a constant-temperature bath to be open beneath the bottom, so it is very bothersome to replace a defective one with a good one.

In the latter apparatus, a viscosimeter selected from an Atlantic viscosimeter, a Cannon-Fenske routine viscosimeter, a Cannon-Fenske opaque viscosimeter and an Ubbelohde viscosimeter can be employed. They all have the same disadvantages as do the former. In the latter apparatuses based on viscosimeters other than the Atlantic type one, the viscosimeters must be turned upside down in sampling or in washing.

It is an object of the present invention to provide a method and an apparatus for automatically measuring the viscosity of opaque liquids as well as transparent ones accurately without being attended by the above-mentioned drawbacks of the conventional methods.

In the method for automatically measuring viscosity, the above-mentioned drawbacks of conventional methods have been overcome by using the Lantz-Zeitfuchs type viscosimeter; a timing means actuated by photoelectric devices consisting of pairs of photoelectric cell and corresponding light source which sense the top surface of a liquid sample passing across the upper and lower timing marks of a time measuring bulb to effect time measurement; electromagnetic valves for measuring the time for viscosity counting, for washing and drying of the viscosimeter and a sequence control means for programming the actuations of said valves as well as pumps to be described hereinafter. That is, these photoelectric devices sense change in the intensity of light on the passage of the sample across the two timing marks, whereby the time spent in the passage of the top surface of the sample between the upper and lower timing marks is measured. The pairs of light source lamps and the corresponding photoelectric cells employed on the timing bulb have been conventionally used with or without encasement in water-proof cases, but in both cases air or steam bubbles are liable to form and stay in narrow clearances between the viscosimeter body and the naked photoelectric devices or the cases thereof and the bubbles often make the photoelectric devices deviate from the normal readings.

The Lantz-Zeitfuchs viscosimeter referred to above is described on page 941 of the "1968 Book of ASTM Standards", Part 17, relating to specifications for kinematic glass viscometers.

As a result of various studies on the disadvantages so far encountered in the conventional apparatuses for automatically measuring the viscosity, the present inventor has found that these disadvantages can be completely overcome, by incorporating a Lantz-Zeitfuchs type reverse flow viscosimeter into the apparatus in the first embodiment of the present invention. Protection tubes for the photoelectric devices consisting of pairs of light source lamps and photoelectric cells are formed with the viscosimeter body to form a one piece assembly at the upper and lower timing marks of a timing bulb in the second embodiment of the present invention.

In the second embodiment of the present invention, since the protection tubes for the photoelectric devices are connected to, and form one piece with the viscosimeter body, there is no room for the formation of air or steam bubbles within the light path of the photoelectric devices and as a result, no error is introduced into the measurement by the photoelectric devices.

Now, the present invention will be explained in more detail, referring to the accompanying drawings.

Figure 1:
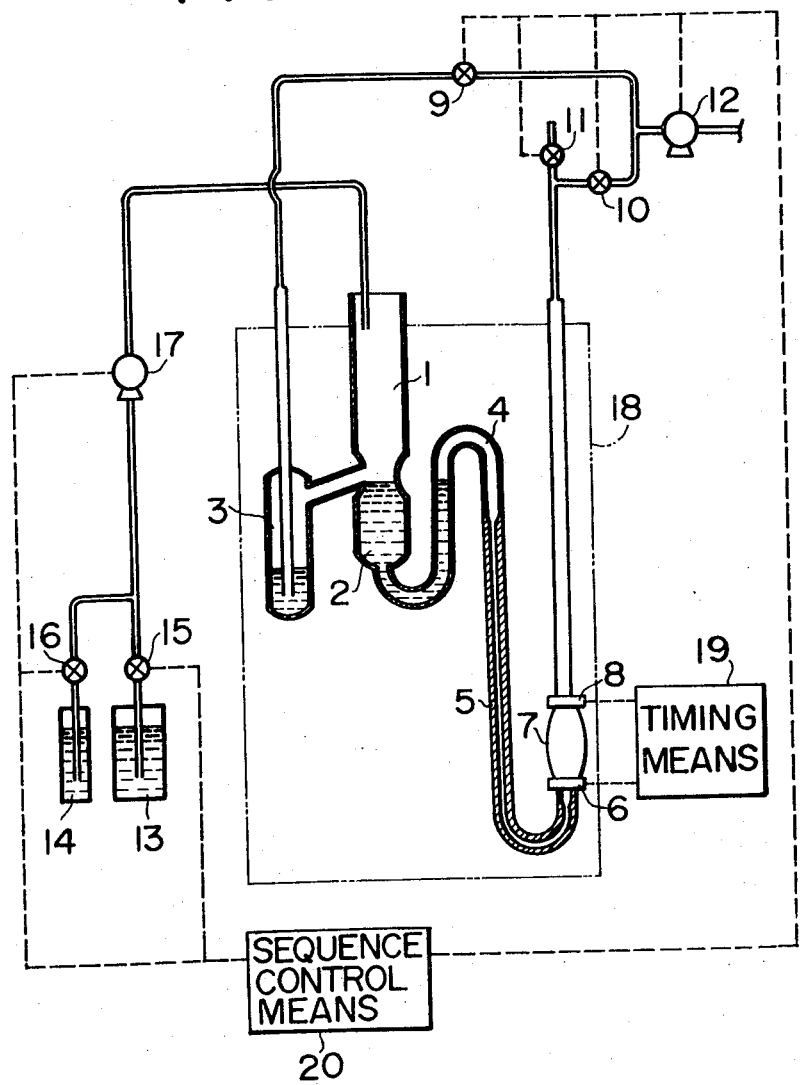
FIG. 1 is a schematic diagram of an apparatus for automatically measuring the viscosity of a liquid according to the first embodiment of the present invention, where an area encircled by a dotted line denotes a constant temperature bath.

As illustrated in FIG. 1, to measure the viscosity of a liquid, a constant-temperature bath 18 is turned on and adjusted, first of all, to have a prescribed constant temperature. Then, an electromagnetic valve 11 is opened by manually starting the timer in the sequence control means 20 (hereafter the actuations of the electromagnetic valves and pumps are automatically carried out in accordance with the programming). The adjustment of the constant-temperature bath and the actuation of the sequence control means are effected automatically and independently after once started manually. A fill bulb 2 is manually filled with a sample from an inlet 1 of the viscosimeter to such an extent that a small amount is overflown. The sample in the fill bulb 2 is left to stand for a predetermined time to attain a constant temperature the same as that of bath 18. The electromagnetic vent valve 11 is closed, an electromagnetic suction valve 10 is opened and a suction pump 12 is started, whereby a siphon of the sample is formed at the inverted U-type tube part 4 of the viscosimeter. Then, immediately the electromagnetic suction valve 10 is closed and the electromagnetic vent valve 11 is opened simultaneously. Thereafter, the sample starts flowing by gravity through a capillary tube 5 by the principle of a siphonal action and the top surface of it comes up the other column having a timing bulb 7 through the lower part of the timing bulb and reaches the upper part thereof. Photoelectric devices 6 and 8, provided respectively at the lower and the upper marks 22, 23 (shown in FIG. 2) of the timing bulk 21 (indicated as 7 in FIG. 1), sense the passage of the top surface of the sample across said marks and signal a timing means 19 to measure the time spent by the passage of the top surface of the same between the timing marks 22 and 23 automatically.

After the measurement of the time for viscosity counting is completed in the foregoing procedure, washing of the inside of the viscosimeter follows.

In washing, the electromagnetic vent valve 11 is closed, the electromagnetic suction valve 10 is opened, and the used sample is discharged by a suction pump 12. Then, the electromagnetic suction valve 10 is closed, an electromagnetic discharge valve 9 is opened, and the surplus sample in an overflow bulb 3 is discharged by a suction pump 12. Then, the electromagnetic suction valve 10 is opened, an electromagnetic control valve 15 is opened while actuating the suction pump 12, and a washing liquid is introduced into the viscosimeter from a washing liquid reservoir 13 by the actuation of a supply pump 17 for supplying a washing liquid to rinse the inside of the viscosimeter. The pump 17, is also used for supplying a drying liquid as hereinafter described. The rinsing is continued for a predetermined time. Then, the electromagnetic control valve 15 is closed, an electromagnetic control valve 16 for a viscosimeter-drying liquid is opened, and the drying liquid is introduced into the viscosimeter from a drying liquid vessel 14. The electromagnetic control valve 16 is closed after a predetermined time and the supply pump 17 is then stopped. The suction pump 12 still continues to work thereafter to allow air to flow through the viscosimeter for drying. After the drying is completed, the electromagnetic discharge valve 9 is closed, the electromagnetic suction valve 10 is closed and the suction pump 12 is stopped. After the completion of the drying all the electrical components are de-energized, except the bath 18, by the actuation of the sequence control means 20. Further, before the read-out counter of the timing means 19 is cleared off to zero manually for the next measurement, the readoffout must be read.

Toluene, or similar hydrocarbons, are preferable as the washing liquor for the viscosimeter. Acetone, or similar organic liquids, are preferable as the drying liquor for the viscosimeter.

Figure 2:
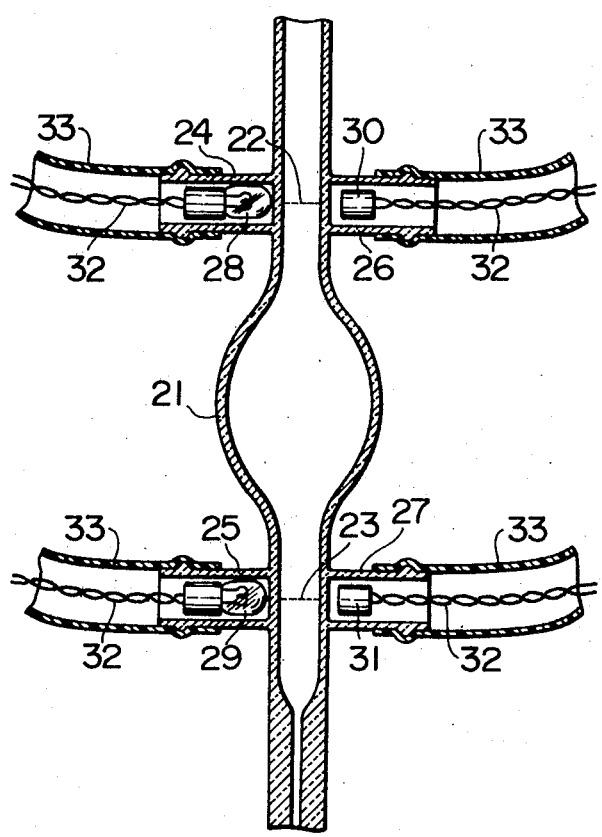
FIG. 2 is a detailed view of the photoelectric devices encased in the protection tubes integrally connected to the viscosimeter body according to the second embodiment of the present invention.

As illustrated in FIG. 2, protection tubes 24-27, consisting of glass, etc., are formed as integral parts of the viscosity body, but are not open to nor communicate with the liquid passageway in the viscosity body. These tubes encase light source lamps 28 and 29 and photoelectric cells 30 and 31 corresponding thereto, at the upper and lower timing marks 22 and 23 of a timing bulb 21 of the viscosimeter. Lead-out wires 32 of the photoelectric means are extended out of the constant-temperature bath, without being wetted, through tubings 33 consisting of plastics, rubber, etc. which are connected to the open ends of the protection tubes 24-27.

What is claimed is:

1. An apparatus for automatically measuring the viscosity of a liquid which comprises,
   a. a Lantz-Zeitfuchs reverse flow viscosimeter, said viscosimeter defining a timing bulb, a fill bulb, and a discharge outlet,
   b. photosensing means mounted adjacent said timing bulb to sense the passage of a liquid through said bulb,
   c. timing means connected to said photoelectric means to measure the time required by the liquid to pass through said timing bulb,
   d. means for automatically evacuating the liquid from the viscosimeter through said discharge outlet,
   e. sequence control means for automatically starting the flow of liquid in said viscosimeter, energizing said timing means, and evacuating said liquid after said timing means has completed its measurement.

2. An apparatus for automatically measuring the viscosity of a liquid as claimed in claim 1 which further comprises means for automatically washing and drying said viscosimeter, said means being controlled by said sequence control means.

3. An apparatus for automatically measuring the viscosity of a liquid as claimed in claim 2 wherein said means for washing and drying said viscosimeter further comprise reservoirs for washing and drying agents, control valves for selectively discharging said agents into said fill bulb, and pump means for assisting in the discharge of said agents, said sequence control means selectively actuating said valves and said pump.

4. An apparatus for automatically measuring the viscosity of a liquid as claimed in claim 1 wherein said timing bulb further defines protective tubes for encasing a light source means and photosensing means at the upper and lower portions of said timing bulb.

5. An apparatus for automatically measuring the viscosity of a liquid as claimed in claim 1 wherein said Lantz-Zeitfuchs reverse flow viscosimeter further defines an inlet portion, said inlet portion being connected to said fill bulb, an overflow bulb connected to the interconnection between said inlet portion and said fill bulb through a downwardly inclined tube, an inverted U-type tube section connected to the bottom of said fill bulb, a U-type capillary tube connected to the outlet end of said inverted U-type tube, said timing bulb connected to the outlet end of said U-type capillary tube, and said discharge outlet connected to the upper end of said timing bulb.

6. An apparatus for automatically measuring the viscosity of a liquid as claimed in claim 1 wherein said means for automatically evacuating the liquid comprise a discharge valve, a suction valve, a vent valve, and pump means for generating a vacuum.

7. An apparatus for automatically measuring the viscosity of a liquid which comprises
   a. a viscosimeter, said viscosimeter defining a fill bulb, a capillary portion, a timing bulb, and a discharge outlet,
   b. photosensing means mounted adjacent said timing bulb to sense the passage of a liquid through said bulb,
   c. timing means connected to said photosensing means to measure the time required by the liquid to pass through said timing bulb,
   d. means for automatically evacuating the liquid from the viscosimeter through said discharge outlet opening, said means comprising a discharge valve, a vent valve, a suction valve, and pump means for generating a vacuum,
   e. means for washing and drying said viscosimeter, said means comprising reservoirs for washing and drying agents, control valves for selectively discharging said agents into said fill bulb, and pump means for assisting in the discharge of said agents to said fill bulb, and f. sequence control means for automatically starting the flow of liquid in said viscosimeter, energizing said timing means, evacuating said liquid after said timing means has completed its measurement, and washing and drying said viscosimeter after said liquid has been evacuated.

8. Apparatus for automatically measuring the viscosity of a liquid as claimed in claim 7 wherein said timing bulb further defines protective tubes for enclosing the light source means and photosensing means at the upper and lower portions of said timing bulb.

* * * * *